(12) United States Patent
Wright et al.

(10) Patent No.: US 7,617,190 B2
(45) Date of Patent: Nov. 10, 2009

(54) DATA FEEDS FOR MANAGEMENT SYSTEMS

(75) Inventors: Travis A. Wright, Everett, WA (US); Baelson B. Duque, Redmond, WA (US); Michael Todd La Riviere, Mercer Island, WA (US); Paul Adrian Oltean, Redmond, WA (US); Benjamin Salim Srour, Seattle, WA (US); Mark Felix Sterin, Redmond, WA (US); Corina Eva Feuerstein, Redmond, WA (US); Alexander Michael Sutton, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 220 days.

(21) Appl. No.: 11/289,125

(22) Filed: Nov. 29, 2005

(65) Prior Publication Data

US 2007/0124285 A1 May 31, 2007

(51) Int. Cl.
*G06F 7/00* (2006.01)
(52) U.S. Cl. .......................................... 707/3; 709/223
(58) Field of Classification Search .................. 707/3; 709/223
See application file for complete search history.

(56) References Cited

U.S. PATENT DOCUMENTS

| | | | |
|---|---|---|---|
| 6,057,757 A | 5/2000 | Arrowsmith et al. | |
| 6,256,623 B1 | 7/2001 | Jones | 707/3 |
| 6,424,980 B1 | 7/2002 | Iizuka et al. | 707/513 |
| 6,582,474 B2 | 6/2003 | LaMarca et al. | 715/500 |
| 6,636,864 B1 | 10/2003 | Owen, Jr. | 707/102 |
| 6,877,002 B2 | 4/2005 | Prince | 707/5 |
| 6,910,040 B2 | 6/2005 | Emmick et al. | 707/8 |
| 6,931,408 B2 | 8/2005 | Adams et al. | 707/100 |
| 6,941,313 B2 | 9/2005 | Seliger et al. | 707/101 |
| 6,954,761 B2 | 10/2005 | Azuma | 707/102 |
| 7,080,141 B1* | 7/2006 | Baekelmans et al. | 709/224 |
| 7,269,625 B1* | 9/2007 | Willhide et al. | 709/206 |
| 7,343,364 B2* | 3/2008 | Bram et al. | 706/47 |
| 2001/0037331 A1 | 11/2001 | Lloyd | |
| 2001/0044837 A1 | 11/2001 | Talib et al. | |
| 2003/0037163 A1 | 2/2003 | Kitada et al. | |
| 2003/0084086 A1 | 5/2003 | Starbuck et al. | |
| 2003/0126056 A1* | 7/2003 | Hausman et al. | 705/36 |
| 2003/0188003 A1 | 10/2003 | Sylvest et al. | |

(Continued)

FOREIGN PATENT DOCUMENTS

EP  0 864 988 A1  9/1998

(Continued)

OTHER PUBLICATIONS

Mima et al., H., "A Methodology for Terminology-based Knowledge Acquisition and Integration", International Conference On Computational Linguistics, Proceedings of the 19th International Conference on Computational Linguistics, vol. 1, pp. 1-7, 2002.

(Continued)

*Primary Examiner*—Etienne P LeRoux
*Assistant Examiner*—Cindy Nguyen
(74) *Attorney, Agent, or Firm*—Leanne Taveggia Farrell; Westman, Champlin & Kelly, P.A.

(57) ABSTRACT

A data feed is defined with a data type and criteria. Each data type corresponds to a type of management related data provided by a management system. The management system is searched for all management related data that corresponds with the data type and the criteria. An aggregator collects the management related data that corresponds with the data type and the criteria. The collected management related data is rendered for a display.

18 Claims, 9 Drawing Sheets

U.S. PATENT DOCUMENTS

| | | | |
|---|---|---|---|
| 2003/0220981 A1 | 11/2003 | Nakamura et al. | |
| 2003/0233287 A1 | 12/2003 | Sadler et al. | 705/28 |
| 2004/0023723 A1 | 2/2004 | Jandel et al. | |
| 2004/0059783 A1 | 3/2004 | Kazui et al. | |
| 2004/0128364 A1 | 7/2004 | Motoyama et al. | |
| 2004/0225749 A1 | 11/2004 | Pavlik et al. | 709/245 |
| 2005/0044070 A1 | 2/2005 | Nagata et al. | 707/3 |
| 2005/0165615 A1 | 7/2005 | Minar | 705/1 |
| 2006/0041593 A1* | 2/2006 | Borthakur et al. | 707/200 |
| 2006/0073812 A1* | 4/2006 | Punaganti et al. | 455/412.1 |
| 2006/0085790 A1* | 4/2006 | Hintermeister et al. | 718/100 |
| 2006/0092861 A1* | 5/2006 | Corday et al. | 370/256 |
| 2006/0168039 A1 | 7/2006 | Worthington | |
| 2006/0173985 A1* | 8/2006 | Moore | 709/223 |
| 2006/0230058 A1* | 10/2006 | Morris | 707/102 |
| 2007/0078675 A1 | 4/2007 | Kaplan | |
| 2008/0126476 A1 | 5/2008 | Nicholas et al. | |

FOREIGN PATENT DOCUMENTS

| | | |
|---|---|---|
| WO | WO 02/07013 A2 | 1/2002 |
| WO | WO 2005/089336 A2 | 9/2005 |

OTHER PUBLICATIONS

Hansen et al., F. A., "RSS as a Distribution Medium for Geo-spatial Hypermedia", Conference on Hypertext and Hypermedia, Proceedings of the Sixteenth ACM Conference on Hypertext and Hypermedia, pp. 254-256, 2005.

Hammond et al., T., "The Role of RSS in Science Publishing", D-Lib Magazine, vol. 10, No. 12, Dec. 2004.

"Event Log RSS", http://www.bvcaddons.com/ProductsInfo.aspx?productid=EVENTLOGRSS-BV at least by Nov. 22, 2005.

"Event Log RSS Feed Generator", http://www.codeproject.com/aspnet/EventLogRss.asp at least by Nov. 22, 2005.

"Event Log Monitoring with RSS", http://www.rassoc.com/gregr/weblog/archive.aspx?post=570 at least by Nov. 22, 2005.

* cited by examiner

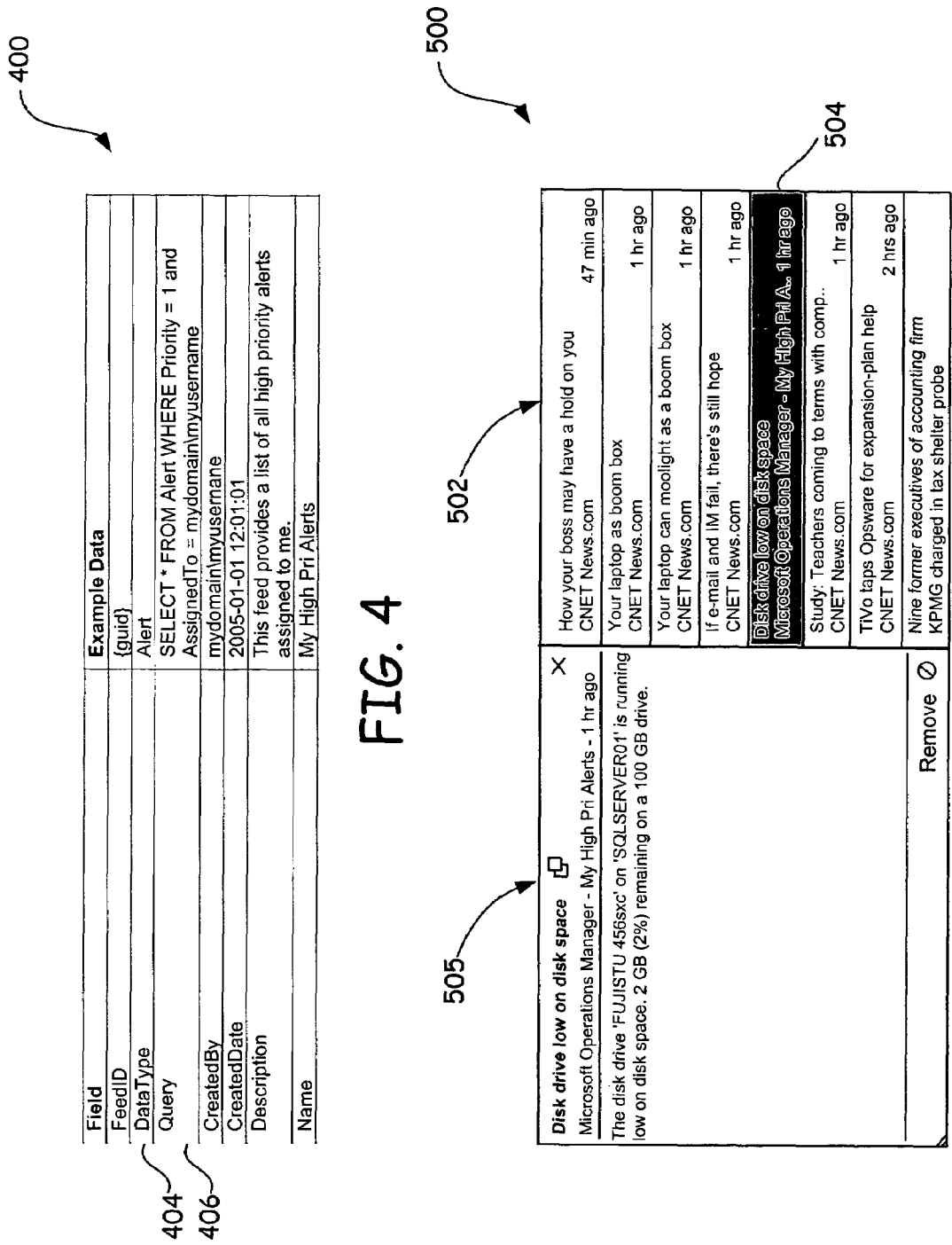

DATA FEEDS FOR MANAGEMENT SYSTEMS

BACKGROUND

Management systems, for example management systems that manage a network of managed objects, typically catalog information, such as events, alert and tickets for different managed objects of a system. For example, the job of the management system is to find problems like operating system problems, application failures, website failures, directory failures, database or SQL (Structured Query Language) server problems, etc. In general, a management system surfaces these problems to a user through a console located on a user accessible device.

Surfacing problems to a console can be problematic. For example, a user must have the console open and running as well as being viewed constantly. If a user has the console closed or if the user is not looking at the console, or does not have access to the console because he is in a remote location, then the user does not know that there has been a problem with one of the managed objects. In addition, the user can receive problems in the console that they do not care about.

A management system can also surface problems to a user through email notifications, email notifications can be said to "push" data to a user. Some systems can generate email data which can be "aggregated" into an email inbox. However, to receive an email notification, a user must have advance knowledge of what information is available or the user risks a flood of mail and or noise. In addition, email data can get lost with many other types of correspondences.

Really Simple Syndication, Rapid Site Syndication and Rich Site Syndication all refer to an emerging technology called RSS used on the Internet. RSS has the ability to access a vast amount of information that exists on the world wide web. Instead of a user browsing websites for information of interest, RSS data feeds send information of interest to a user directly. An RSS feed can be said to "pull" data into an aggregator. In general, RSS feeds data, such as a news syndications or weblogs, using a RSS feed. A user of the RSS feeds can install a RSS aggregator to periodically poll and retrieve information when the RSS feed finds new feed items. After the RSS aggregator retrieves information from a RSS feed, new feed items are displayed to a user. For example, if a user has a subscription to a New York Times RSS feed, the user's RSS aggregator will retrieve feed item found by the RSS feed to be displayed to a user. Tagging is also an emerging technology on the Internet. Tags are used to add metadata to websites and components in a website, for example a news article.

The discussion above is merely provided for general background information and is not intended to be used as an aid in determining the scope of the claimed subject matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

Communicating management related data provided by a management system to a user using a data feed allows for the simplistic searching and processing of management related data as well as the collating of management related data into a single place. A data feed is defined with a data type and criteria. Each data type corresponds to a type of management related data provided by the management system. The management system is searched for all management related data that corresponds with the data type and the criteria. The management related data that corresponds with the data type and the criteria is collected into an aggregator. The management related data is rendered on a display for viewing by a user.

Tagging management related data provided by a management system to a user allows for the simplistic searching and processing of management related data. Management related data is provided to a user. The user attaches the tags to management related data upon user instruction. The tags attached to the management related data are stored in a database of the management system.

BRIEF DESCRIPTION OF THE DRAWINGS

FIG. 4 illustrates an exemplary data feed record.

FIG. 5 illustrates an exemplary display showing rendered management related data or feed items.

DETAILED DESCRIPTION

The following description is described in the context of a management system for managing a networked environment or enterprise system. The following description is also described in the context of a management system for managing an operating system of a computing device.

Figure 1:
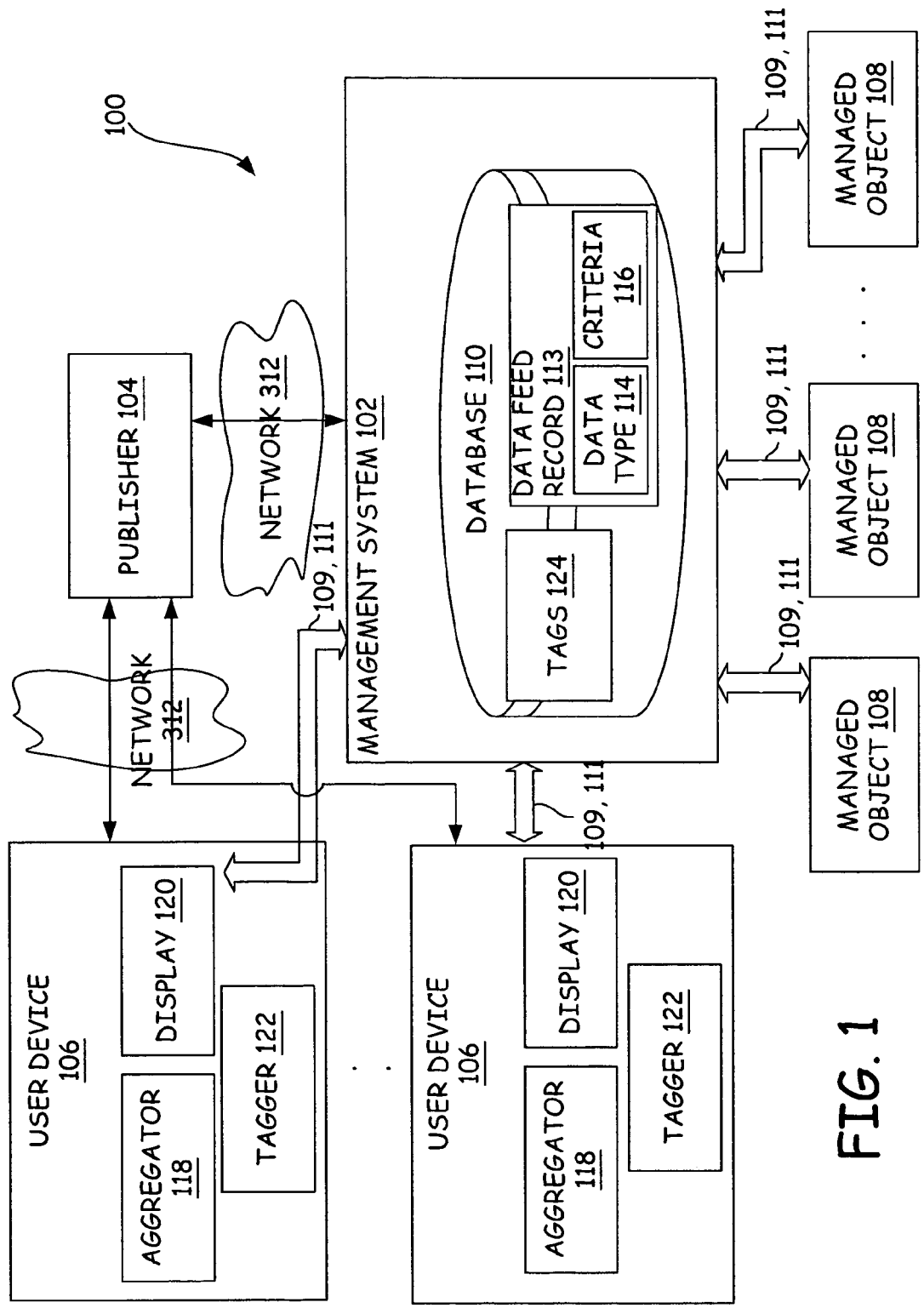
FIG. 1 illustrates a schematic block diagram of a networked environment.

FIG. 1 illustrates a schematic block diagram of one embodiment of a networked environment or system 100. Networked system 100 includes a management system 102, a publisher 104, a plurality of user devices 106 and a plurality of managed objects 108. Each user device 106 includes an aggregator 118, a display 120 and a tagger 122. Examples of managed objects 108 include applications, servers, databases, computing devices and etc. This list of example managed objects is not an exhaustive list. The networked environment or system 100 can include a local area network (LAN) and a wide area network (WAN), but may also include other types of networks. Such networking environments are commonplace in offices, enterprise-wide computer networks, intranets and the Internet.

In a LAN networking environment, managed objects 108, management system 102 and user devices 106 are connected to a LAN 109 through a network interface or adapter. In a WAN networking environment, managed objects 108, management system 102 and user devices 106 typically include modems or other means for establishing communications over a WAN 111, such as the Internet. It will be appreciated that the network connections shown are exemplary and other means of establishing a communication link between managed objects 108, management system 102 and user devices 106 may be used.

Management system 102 is configured to manage operations of the plurality of managed objects 108, find problems and provide knowledge of the problems or management related data to users of the networked environment or system 100. Embodiments include networked environment or system 100 communicating management related data provided by management system 102 to a user through a data feed. For example, the data feed can be a RSS (Really Simple Syndication, Rich Site Syndication or Rapid Site Syndication) data feed. However, before describing further aspects, it may be useful to first describe exemplary computing devices or environments that can implement the description provided below.

Figure 2:
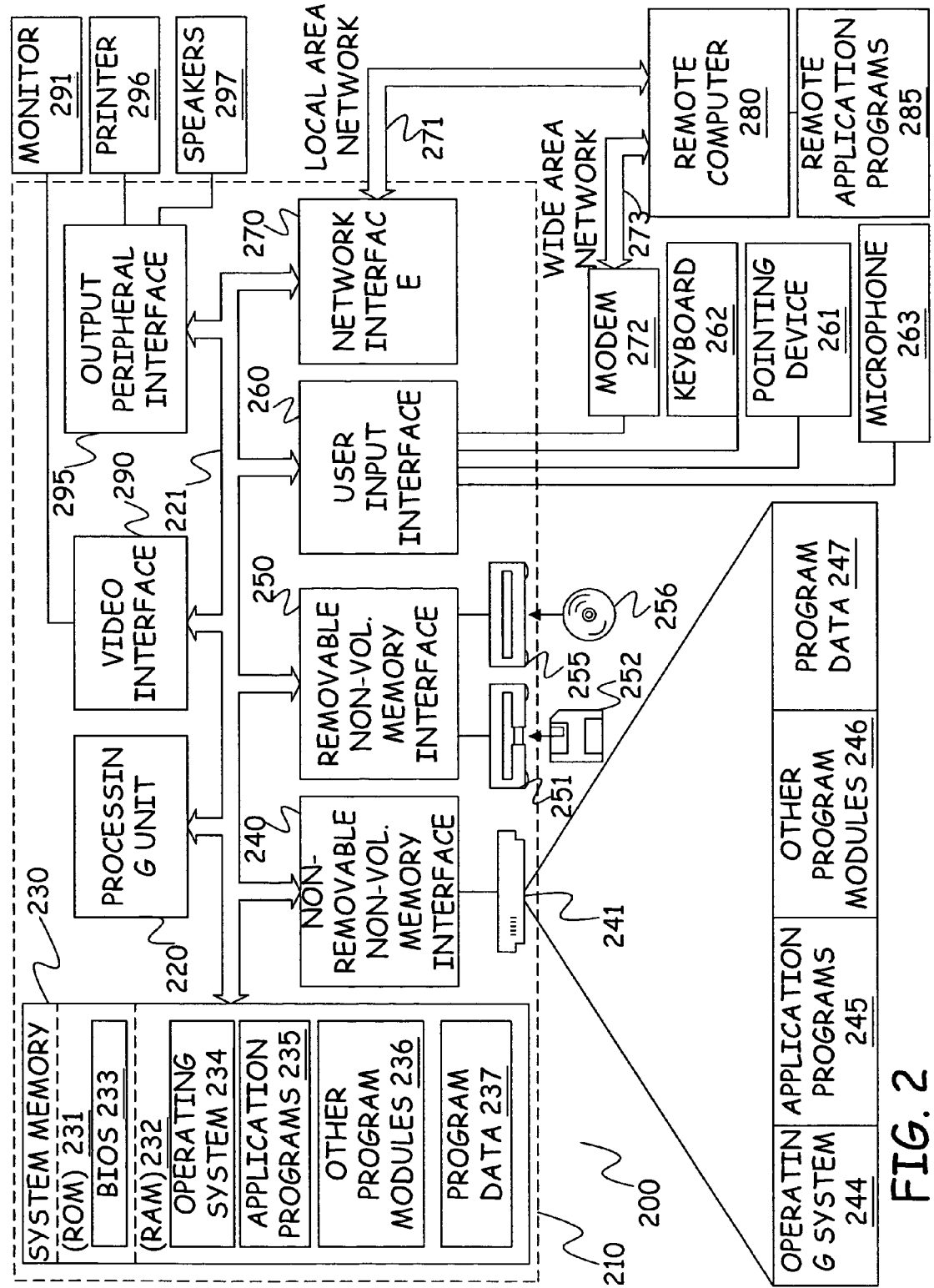
FIG. 2 illustrates a first exemplary computing environment.

FIG. 2 illustrates a first example of a suitable computing system environment 100 on which the concepts herein described may be implemented. The computing system environment 200 is only one example of a suitable computing environment and is not intended to suggest any limitation as to the scope of use or functionality of the claimed subject matter. Neither should the computing environment 200 be interpreted as having any dependency or requirement relating to any one or combination of components illustrated in the exemplary operating environment 200.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 2, an exemplary system for implementing some embodiments includes a general-purpose computing device in the form of a computer 210. Components of computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 210 typically includes a variety of computer readable media. Computer readable media can be any available media that can be accessed by computer 210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies.

A user may enter commands and information into the computer 210 through input devices such as a keyboard 262, a microphone 263, and a pointing device 261, such as a mouse, trackball or touch pad. Other input devices (not shown) may include a joystick, game pad, satellite dish, scanner, or the like. These and other input devices are often connected to the processing unit 220 through a user input interface 260 that is coupled to the system bus, but may be connected by other interface and bus structures, such as a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 is operated in a networked environment using logical connections to one or more remote computers, such as a remote computer 280. The remote computer 280 may be a personal computer, a hand-held device, a server, a router, a network PC, a peer device or other common network node, and typically includes many or all of the elements described above relative to the computer 210. The logical connections depicted in FIG. 2 include a local area network (LAN) 271 and a wide area network (WAN) 273, but may also include other networks.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on remote computer 280. It will be appreciated that the network connections shown are exemplary and other means of establishing a communications link between the computers may be used.

Figure 3:
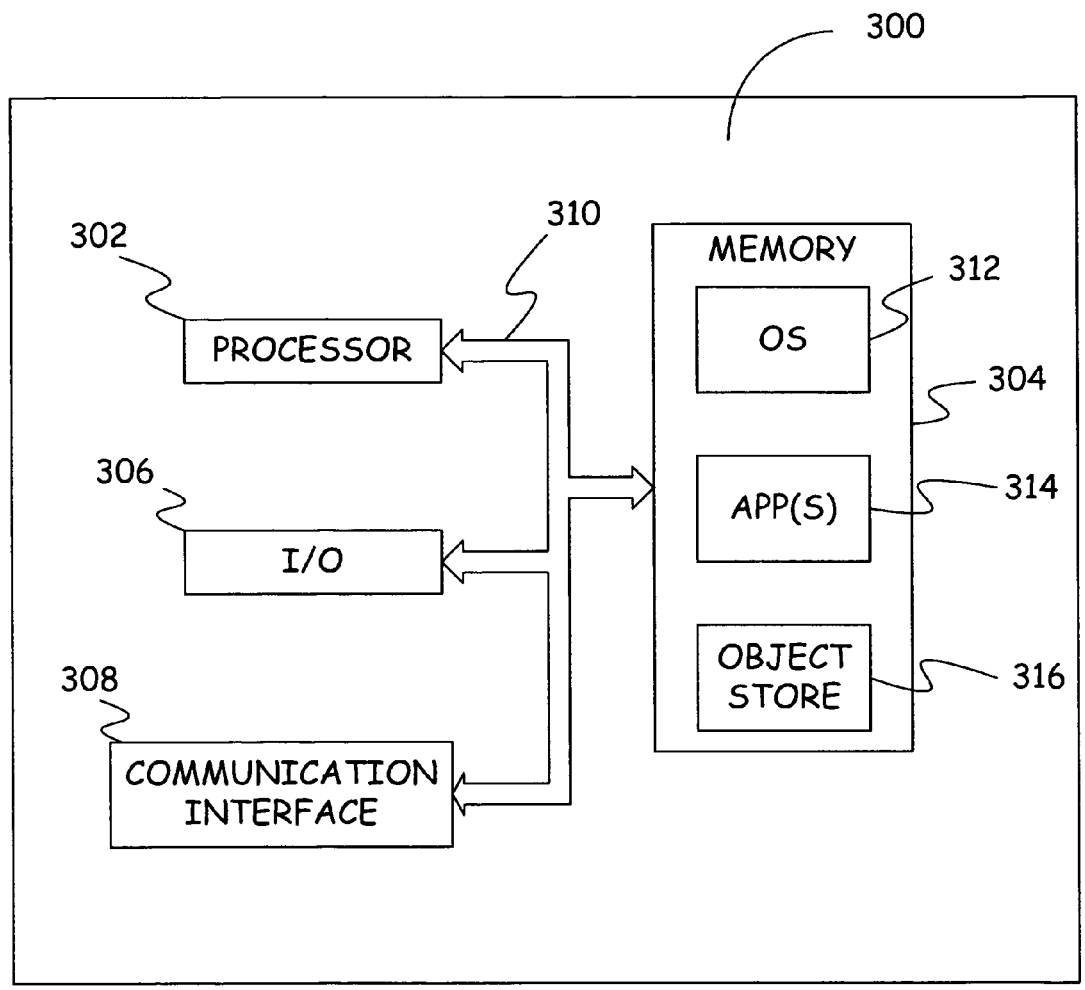
FIG. 3 illustrates a second exemplary computing environment.

FIG. 3 is a block diagram of a mobile device 300, which is a second example computing environment. Mobile device 300 includes a microprocessor 302, memory 304, input/output (I/O) components 306, and a communication interface 308 for communicating with remote computers or other mobile devices. In one embodiment, the aforementioned components are coupled for communication with one another over a suitable bus 310.

Memory 304 is implemented as non-volatile electronic memory such as random access memory (RAM) with a battery back-up module (not shown) such that information stored in memory 304 is not lost when the general power to mobile device 300 is shut down. A portion of memory 304 is preferably allocated as addressable memory for program execution, while another portion of memory 304 is preferably used for storage, such as to simulate storage on a disk drive.

Memory 304 includes an operating system 312, application programs 314 as well as an object store 316. During operation, operating system 312 is preferably executed by processor 302 from memory 304. Operating system 312, in one preferred embodiment, is a WINDOWS® CE brand operating system commercially available from Microsoft Corporation. Operating system 312 is preferably designed for mobile devices, and implements database features that can be utilized by applications 314 through a set of exposed application programming interfaces and methods. The objects in object store 316 are maintained by applications 314 and operating system 312, at least partially in response to calls to the exposed application programming interfaces and methods.

Communication interface 308 represents numerous devices and technologies that allow mobile device 300 to send and receive information. The devices include wired and wireless modems, satellite receivers and broadcast tuners to name a few. Mobile device 300 can also be directly connected to a computer to exchange data therewith. In such cases, communication interface 308 can be an infrared transceiver or a serial or parallel communication connection, all of which are capable of transmitting streaming information.

Input/output components 306 include a variety of input devices such as a touch-sensitive screen, buttons, rollers, and a microphone as well as a variety of output devices including an audio generator, a vibrating device, and a display. The devices listed above are by way of example and need not all be present on mobile device 300. In addition, other input/output devices may be attached to or found with mobile device 300.

Referring back to FIG. 1, management system 102 is configured to catalog different types of management related data, such as alerts, events, tickets or incidents, problems and other types of management related data. The different types of management related data are different ways for management system 102 to present to users of system 100 that something is happening with at least one of the managed objects 108. Each type of management related data can be discovered in a data feed. For example, management related data can be "raw data" (i.e. events), new events called alerts that process the "raw data" and a higher level correlation such as a ticket. In one embodiment, a ticket or incident is a work list or a "to do" list for remedying a problem. Each time there is a problem, a ticket or incident is created. Different portions of the ticket can be routed to different users of the management system 102 and can be tracked. After each item on the ticket is accomplished, the ticket is closed. Closing the ticket requires inputting information on the ticket relating to how the problem was solved. In general, problems can be collections of similar incidents that have a root cause. In one embodiment, tickets or incidents can be managed by an application that is outside of management system 102 as well as used to manage workflow processes for making changes to system 100. In another embodiment, events can be used to determine problems, which result in alerts. In this embodiment, alerts can be used to form a ticket.

All of the management related data (i.e. alerts, events, tickets and problems) include properties. Example properties include the severity of the management related data, the priority of the management related data, who the management related data is assigned to, when the management related data was created, the resolution state of the management related data and what managed object or group of objects the management related data refers to. This list of properties is a representative list and not an exhaustive list. As management related data gets processed, triaged and handled by a user, the management related data may change in resolution state. For example, the resolution states can include investigated, escalated, escalated to a tier, resolved and other types of resolution states.

Management system 102 can provide other functions other then providing the specific types of management related data already described to a user. Management system 102 can formulate new reports on specific managed objects or groups of managed objects. Management system 102 can include tasks. Tasks can be run by a user to fix a problem with part of the networked infrastructure. For example, a user can run a task to reboot one of the managed objects 108. Management system 102 can include help information. Help information instructs a user how to troubleshoot a problem. Management system 102 can include performance data or summaries of performance data about a particular computing device 108 or component in a particular computing device. Performance data can be provided in a tabular representation or in a graphical representation. Management system 102 can include health status states for each of the computing devices 108. For example, if there is a problem with one of the computing devices 108, management system 102 can change its state from a healthy state to an unhealthy state. Management system 102 can also provide key performance indicators. Key performance indicators are factors of which users of management system 102 are evaluated against. For example, key performance indicators can keep track of the average handling time of an incident or ticket or how quickly an incident or ticket is resolved from when it is issued.

In accordance with an embodiment, management system 102 includes a database 110. Database 110 includes a plurality of data feed records 113. Each data feed record 113 includes a data type 114 and criteria 116. Each data type 114 corresponds with a type of management related data provided by management system 102. Each data type 114 can correspond with an alert, an event, a ticket/incident, a problem or other type of management related data as previously discussed in detail above. Criteria 116 can be at least one of the properties of management related data as discussed in detail above. Each data feed record 113 is defined by a user and specifies information that the user desires from the management system.

FIG. 4 illustrates an exemplary data feed record 400. Data feed record 400 includes an unique data feed identifier 202 (e.g. GUID), a data type 404, a query or criteria 406, and user information such as a creator, a created data, a description and a name. In this example, data type 404 is an alert and criteria 406 includes a priority indication and that the alert has been assigned to the user.

Publisher 104, in the embodiment illustrated in FIG. 1, can be a web server or other type of server accessible or not accessible over hypertext transfer protocol (HTTP) connection. Using a server not accessible over an HTTP connection eliminates reliance on a HTTP server as well as eliminates reliance on a trusted environment where authentication solutions are not possible. In cases where authentication solutions are not possible, other suitable ways to periodically transport the data feed from the publisher 104 to management system 102 can be used. For example, a data type 114 and criteria 116, previously mentioned above and will be discussed below in detail, can be exposed to a file sharing system. It would be much more simplistic to create and manage an existing file share system as opposed to maintaining a HTTP server and its associated security settings.

In FIG. 1, publisher 104 communicates with management system 102 and user devices 106 over a network 112, such as the Internet or an intranet. Publisher 104 can optionally restrict access to certain user devices 106 based on a security policy. Publisher 104 is configured to access data feed records 113, receive specific management related data (i.e. specific alerts, tickets, problems and etc.) and create a corresponding data feed item that is sent to the user. The data feed item can be created as an Extensible Markup Language (XML) file or be created dynamically through an Active Server Page (ASP) file. An example XML data feed item (file) based on the exemplary data feed record 400 and where the specific alert is a hard disk drive running low on space is as follows:

```
<?xml version="1.0" encoding="utf-8"?>
<rss version="2.0">
    <channel>
        <title>Microsoft Operations Manager - My High Pri Alerts</title>
        <link>http://momserver01</link>
        <description>
            This feed provides a list of high priority alerts assigned to
            me.
        <description>
        <copyright>Copyright 2005 Microsoft</copyright>
        <language>en-us</language>
        <image>
            <url>httpL//twright3/mom.jpg</url>
            <title>Microsoft Operations <Manager Data Feeds</title>
            <link>http://twright3</link>
        </image>
        <lastBuildDate>Mon, 29 Aug 2005 17:10:17 GMT</lastBuildDate>
        <category>Alerts</category>
        <ttl>60</ttl>
        <item>
            <title>Disk drive low on disk space</title>
                <description>
                The disk drive 'FUIJISTU 456sxc' on 'SQLSERVER01'
                is running low on disk space. 2 GB (2%) remaining on a 100 GB
                drive.
                </description>
                <link>
                http://twright3/view/alerts/aspx?id={1946829a-a35d-3b29-09f8-0467043c9e77}
                </link>
```

```
            <pubDate>Mon, 29 Aug 2005 17:22:17 GMT</pubDate>
            <category>Alerts</category>
        <item>
    <channel>
</rss>
```

In one embodiment, criteria 116 can be specified or added directly into a URL, Typically this requires the criteria to be in a generic format. In this case, by identifying an ASP file, publisher 104 can decide to expose a static, management system 102 to a Dynamic HTML (DHTML) page that would allow the construction of these URLs through simple user interface operations instead of needing a dedicated server user interface. This dynamic URL model typically requires a dedicated ASP file and typically will not work if there is a file share system included.

The following is an example ASP file that can be used to create a data feed item. This example ASP file accesses management system 102 for all management related data that corresponds with the data type alerts and the criteria of resolution state in a specified state.

```
//<summary>
// Generates an RSS XML response with data from the MOM Management Server Class Library.
//</summary>
/////////////////////////////////////////////////////////////////////////
namespace Microsoft.Samples.MomSdk
    {
                using System;
                using System.Configuration;
                using System.Web;
                using Microsoft.EnterpriseManagement.Mom;
        public class MomSummaryRSS: System.Web.UI.Page
        {
            private Administration mom = Administration.GetAdministrationObject( );
            /// <summary>
            /// Builds the response as an XML document conforming to
            /// the RSS 2.0 schema.
            /// </summary>
            /// <param name="sender">The event sender</param>
            /// <param name="e">The event arguments</param>
            private void Page_Load(object sender, System.EventArgs e)
            {
                string WebConsoleServer = ConfigurationSettings.AppSettings["WebConsoleServer"];
                long newAlertCount = GetAlertCount(Byte.Parse("0"));
                long aknowledgedAlertCount = GetAlertCount(Byte.Parse("85"));
                long level1AlertCount = GetAlertCount(Byte.Parse("170"));
                long level2AlertCount = GetAlertCount(Byte.Parse("180"));
                long level3AlertCount = GetAlertCount(Byte.Parse("190"));
                long level4AlertCount = GetAlertCount(Byte.Parse("200"));
                string groupName = mom.GetManagementGroupName( );
                HttpContext context = HttpContext.Current;
                HttpResponse response = context.Response;
                // begin writing to the response stream
                response.AppendHeader("Content-Type", "text/xml");
                response.Write("<?xml version=\"1.0\"?>" + "\n");
                response.Write("<rss version=\"2.0\">");
                    response.Write(" <channel>");
                    response.Write("    <title>MOM Summary for " + groupName + "</title>");
                    response.Write("    <link>" + WebConsoleServer + "</link>");
                    response.Write("    <language>en-us</language>");
                    response.Write("    <description>Latest operations data for the " + groupName + " MOM Management
Group.</description>");
                    response.Write("    <item>");
                    response.Write("    <title> Alerts, by resolution state.</title>");
                    response.Write("    <link>" + WebConsoleServer + "/default.aspx?v=a</link>");
                    response.Write("    <description>New alerts: " + newAlertCount.ToString( )
                        + ", Acknowledged alerts: " + aknowledgedAlertCount.ToString( )
                        + ", Level 1 alerts: " + level1AlertCount.ToString( )
                        + ", Level 2 alerts: " + level2AlertCount.ToString( )
                        + ", Level 3 alerts: " + level3AlertCount.ToString( )
                        + ", Level 4 alerts: " + level4AlertCount.ToString( ));
                    response.Write("    </description>");
                    response.Write("    </item>");
                    response.Write("    <item>");
                    response.Write("    <title>Managed computers, by type.</title>");
```

```
            response.Write("    <link>" + WebConsoleServer + "/default.aspx?v=c</link>");
            response.Write("    <description>Agent-managed computers: " +
    mom.GetAgentManagedComputers( ).TotalCount.ToString( )
                + ", Agentless-managed computers: " +
    mom.GetAgentlessManagedComputers( ).TotalCount.ToString( ));
            response.Write("    </description>");
            response.Write("    </item>");
        response.Write(" </channel>");
        response.Write("</rss>");
        }
        /// <summary>
        /// Queries the MOM management server for the number of alerts
        /// currently in the specified resolution state.
        /// </summary>
        /// <param name="ResolutionState">The resolution state, as a byte value.</param>
        /// <returns>The number of matching alerts found.</returns>
        private long GetAlertCount(byte ResolutionState)
        {
        AlertQuery query = mom.GetAlertQueryObject( );
        AlertsCollection alerts = query.GetAlertsByResolutionStateId(ResolutionState);
        return alerts.TotalCount;
        }
        #region Web Form Designer generated code
        override protected void OnInit(EventArgs e)
        {
        //
        // CODEGEN: This call is required by the ASP.NET Web Form Designer.
        //
        InitializeComponent( );
        base.OnInit(e);
        }
        /// <summary>
        /// Required method for Designer support - do not modify
        /// the contents of this method with the code editor.
        /// </summary>
        private void InitializeComponent( )
        {
        this.Load += new System.EventHandler(this.Page_Load);
        }
        #endregion
    }
}
```

User devices 106 each include an aggregator 118 and a display 120. User device 106 can be a computing system or device that is accessible to a user. For example, user devices 106 can be any one of the computing environments discussed above. In one embodiment, user device 106 can receive data feed items when sent by publisher 104. In another embodiment, a user can view the data feed item by pointing aggregator 118 at the uniform resource locator (URL) to the XML or ASP file on publisher 104 to subscribe to a particular data feed. In yet another embodiment, aggregator 118 is configured to collect or poll all the management related data that corresponds with the data type 114 and the query or criteria 116 of the data feed record 113 of the data feed which the user has subscribed. In the example illustrated in FIG. 2, aggregator 118 collects all alerts in management system 102 that have a high or a number one priority and are assigned to the user.

The collected management related data is then published or viewed on display 120. FIG. 5 illustrates an exemplary display 500 showing the rendered management related data or feed items 502. A list of all the feed items and a summary for each can be provided as illustrated. By clicking on a selected summary feed item, additional details are rendered at 305 on display 300. If desired, additional details can be rendered in a web page at a URL that can include links for the user to take action as provided by management system 102.

Similar data feeds records can be created for many different types of management related data besides alerts, incidents, problems and etc. As highlighted in detail above, such other types of management related data can be created to feed other types of management related data then those already described.

Data feed records can be created to notify a user when management system 102 formulates a new report. The data feed record 113 includes a data type 114 being a new report and criteria 116 related to a particular managed object or group of managed objects. In addition to notifying the user of a new report, the data feed item can also include the report. The report can be sent as an attachment in the data feed item. Example attachments to feed items can include a spreadsheet document, a word processing document, a portable document (e.g. .pdf), a photograph or picture, or link to the same.

Data feed records can also be created to notify a user when a pack or collection of information is available that describes how management system 102 is to manage a particular application of system 100. These packs or collections of information are generally published on the Internet. A data feed can notify a user when a pack is available.

Data feed records can include types of management related data, which can be encoded with embedded links. In one example, a data feed item can include an embedded link for running a task. As previously discussed, a task can be run by a user to fix a problem with part of the networked environment. The user can click on the embedded link and run the appropriate task. In another example, a data feed item can include an embedded link to open a view in user device 106. The view can include, for instance, help information for troubleshooting the problem.

Data feed records can also be created to send performance data or report snapshots/summaries of a particular managed object 108. In particular, a user can define a data feed record to send a summary of the performance of a managed object, such as a processor, through a data feed item. As previously discussed, the performance of the managed object can be a tabular representation or graphical representation.

Data feed records can also be created to send health status updates of a particular managed object 108. When management system 102 decides that a managed object has a problem, the management system changes the health of the managed object to an unhealthy state.

Data feed records can be created to notify a user about a new incident or problem. In addition, data feeds can be created to send notifications when management related data is updated, such as when a notification of a new alert, incident, report and etc. For example, a user can subscribe to a data feed record to receive alerts having a severity of high priority. If after the user receives a high priority alert, a different user designates that particular alert as a low priority, then a data feed can notify a user that the severity of the alert has changed to a low priority.

Data feed records can also be created to notify users that their participation is required in a workflow of a ticket as managed by an application that manages tasks. For example, when a new server is being implemented in a networked system, one of the steps of the associated ticket is to have an order for a new server approved by a manager. A data feed record can be created to notify the manager that he/she needs to approve the order of the new server. In addition, a data feed record can be created to notify a user who actually ordered the implementation of a new server to track the status of the ticket.

Data feed records can also be created to show a performance indicator. Performance indicators are management related data that a user is evaluated against. For example, performance indicators can include how quickly an incident is resolved from the time that it is opened. In general, a manager could subscribe to these data feeds to evaluate users of system 100.

Data feed records can also be created that shows similar managed objects that have similar incidents that may indicate a root problem that has these incidents. Management system 102 can include an application that analyzes many incidents and looks for similarities in the incidents. For example, if five people called in with an outage on their computer of a similar application but different symptoms, the application would categorize these five calls as being similar. The data feed would include a possible root problem as well as the 5 incidents that have been reported.

In addition to system 100 including a data feed item functionality for communicating management related data to a user, in another embodiment, system 100 includes metadata or tagging functionality. The tagging functionality does not require that system 100 also include a data feed item functionality nor does the data feed item functionality require that system 100 also include a tagging functionality. In the tagging embodiment, when a user comes across management related data, whether or not via a data feed or conventionally viewed in a console, the user can choose to tag (i.e. identify, store directly or indirectly and selectively access at a later time) that piece of management related data, such as an alert, an incident, a problem and etc., using a keyword or words meaningful to the user. In FIG. 1, tagger 122 is a module that performs the functionality described above. However, new management related data presented to a user can also be automatically tagged by tagger 122 based on a set of rules created by the user. For example, all new management related data that includes information about a particular server in the network can be automatically tagged. If desired, tags can be at least temporarily stored on user device 106, but also be stored in database 110 of management system 102 as indicated at 124. Tags 124 can be centrally managed and optimized by an administrator. Tags 124 can also be made global across system 100, made accessible for many users and can be personalized per user. Typically each tag 124 includes attributes that at least includes the keyword or identifier of the tag.

Tags 124 can be used in criteria 116 in a data feed record. For example, a user could tag a specific alert using a keyword. The keyword(s) can be received as a data feed item or locally generated on the user device 106. Such a tag would be assigned a keyword(s). The keyword(s) can be used in the criteria to create and subscribe to a data feed record that will communicate all management related data related to an identified alert. In this manner, a supervisor can find tune his/her data feed records for particular information.

In one embodiment, an administrator can also centrally manage and optimize tags 124 by publishing the tags to an accessible central location or clearing house in management system 102 that is accessible to all users of system 100 to ensure consistent tagging by all the users. In another embodiment, management system 102 can rate tags and assign a "weight" of useful information to a tag. In still another embodiment, a user can tag views of help information. Tagging help information provides a system of searching for useful knowledge articles for troubleshooting problems with a management system.

Figure 6:
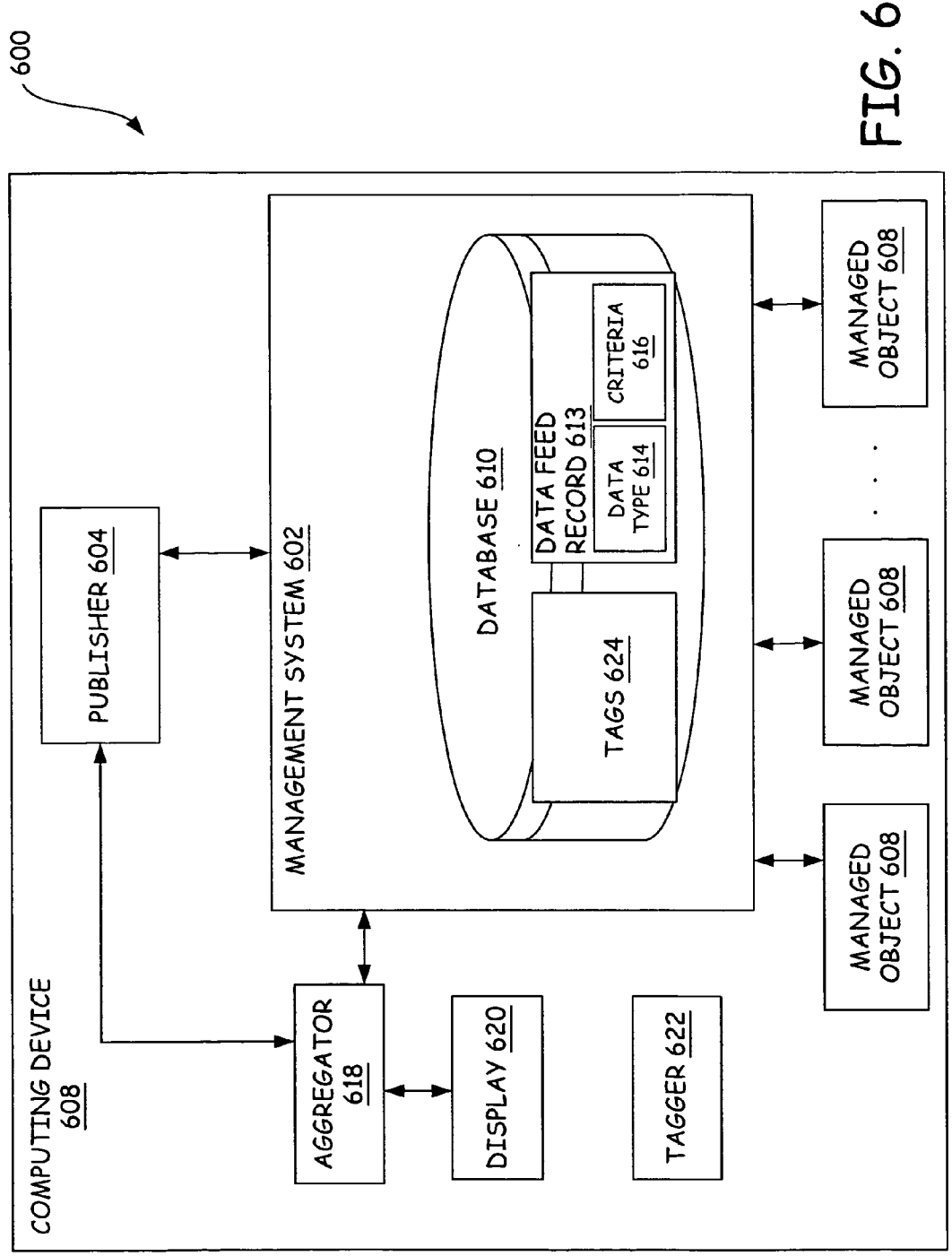
FIG. 6 illustrates a schematic block diagram of a system including a computing device having an operating system.

FIG. 6 illustrates a schematic block diagram of an embodiment of an environment or system 600. Unlike the embodiment illustrated in FIG. 1, system 600 includes a single computing device 608 and includes the functionality of management system 602, a publisher 604, an aggregator 618, a display 620 and a tagger 622. Although publisher 604 could be some type of server, in general, publisher 604 can be a file share system. Publisher 604 can optionally restrict access to a user based on a security policy. Management system 602 includes a database 610 that can store data feed records 613 including a data type 614 and criteria 616 and tags 624. Management system 602 is configured to manage managed objects 606. Accordingly, operation of these modules is the same as described above. It should be noted that publisher 604 can be separate from or formed as a part of the operating system of computing device 608. Typically, managed objects 608 are applications running on computing device 608.

Figure 7:
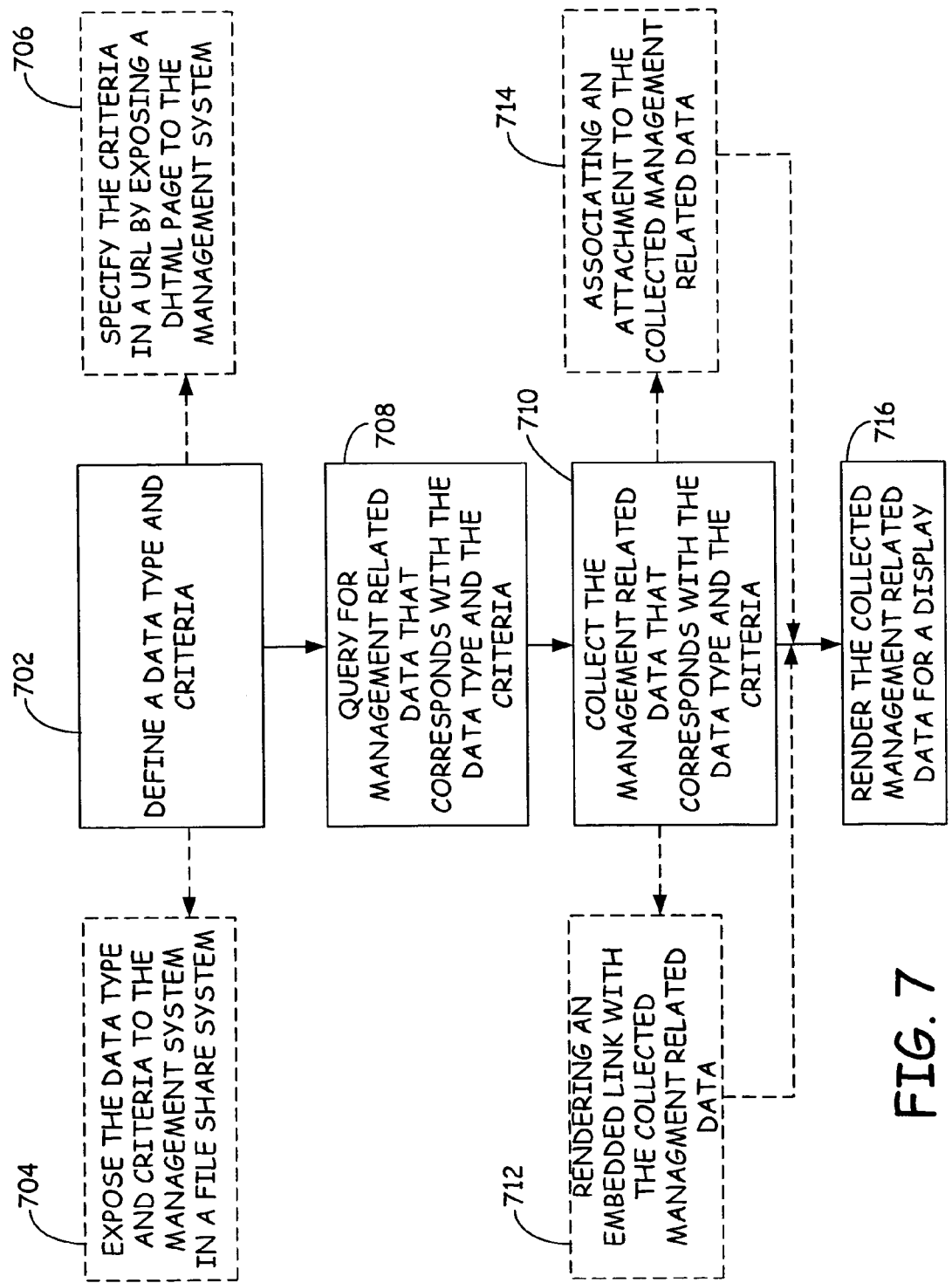
FIG. 7 illustrates a flowchart describing a computer-implemented method of communicating management related data provided by a management system to a user.

FIG. 7 illustrates a flowchart 700 of an embodiment of a computer-implemented method for communicating management related data provided by a management system to a user. The computer-implemented method begins at block 702 by defining a data type and a criteria. Data types 114 and 614 and criteria 116 and 616 are illustrated in FIGS. 1 and 6. The method illustrated in flowchart 700 can optionally (as indicated by dashed lines) proceed to block 704 or 706. At block 704, the data type and criteria can be exposed to the management system in a file share system. As discussed above, it may be convenient to not include a direct HTTP connection between the aggregator 118, 618 and the publisher 104, 604. One reason is to avoid dependency on an HTTP server. Another reason is that the environment may be not be trusted where authentication solutions are not possible. At block 706, the criteria can be specified in a URL by exposing a DHTML page to the management system. The DHTML page allows the construction of these URLS through simple user interface operations instead of needing a dedicated server user interface. This dynamic URL model will require a dedicated ASP page and will not work if there is a file share system. Regardless of whether step 704 or 706 is used in the method illustrated in FIG. 7, the environments or systems 100 and 600 of FIGS. 1 and 6 provide a way to optionally control the authentication and authorization of the data in step 704 or 706. In other words, environments or systems 100 and 600 police who (i.e. what users) are able to access a data feed. Security restrictions can be implemented using an access control list (ACL). An ACL can include a data structure that specifies rights for individual users or a group of users.

At block 708, all management related data that corresponds with the data type and the criteria is queried for in management system 102, 602. At block 710, the management related data that corresponds with the data type and the criteria is collected into aggregator 118, 618. The method illustrated in flowchart 700 can optionally (as indicated by dashed lines) proceed to block 712 or 714. In block 712, the collected management data can be rendered with an embedded link. As previously discussed, management related data can include an embedded link for running a task or an embedded link to open help information to aid in troubleshooting the problem. In block 714, a document can be associated with the collection of management related data. As previously discussed, documents such as spreadsheet documents, word processing documents, portable documents, pictures and links can be associated with data feed items. At block 716, the collected management related data is rendered for a display 120, 620.

Figure 8:
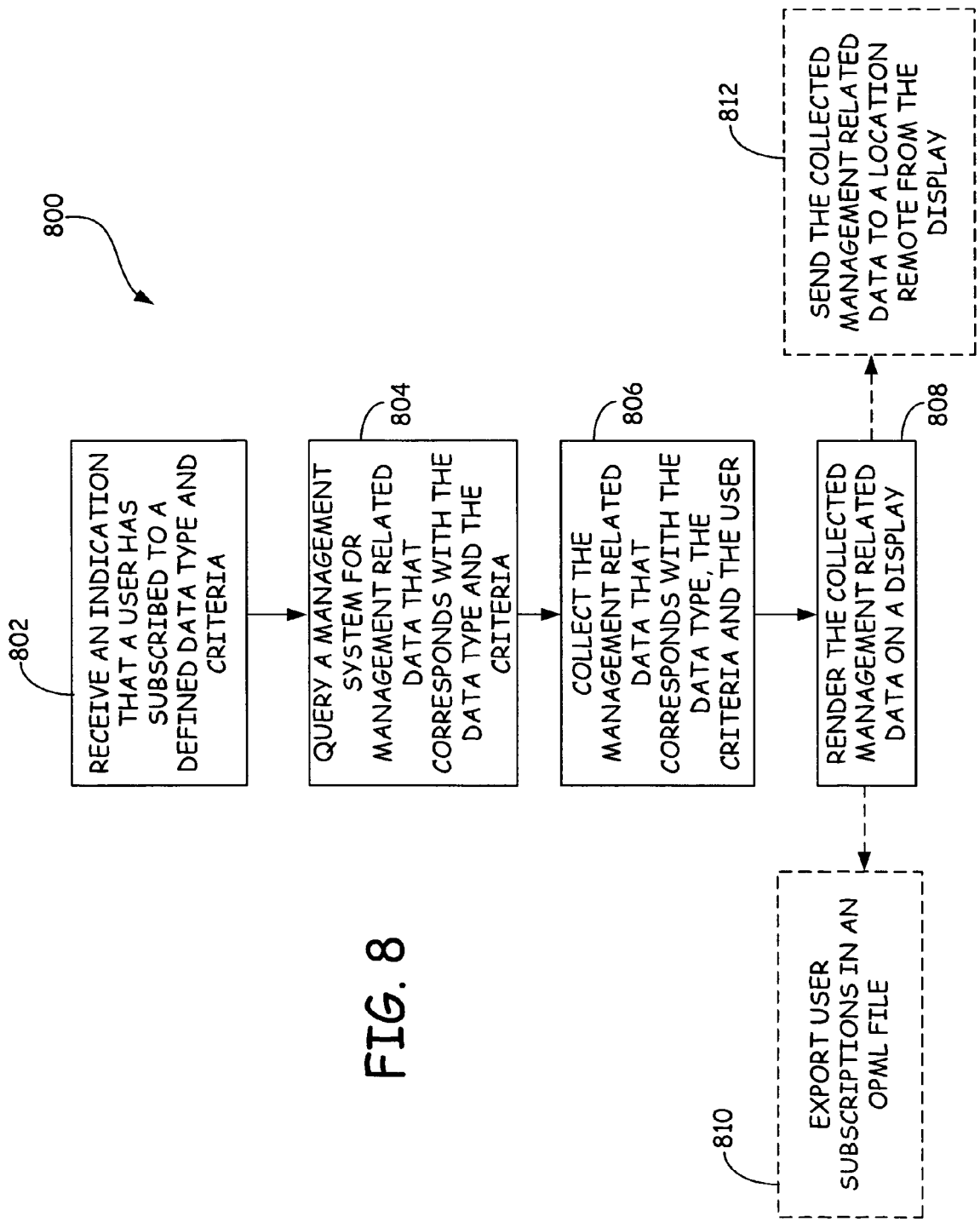
FIG. 8 illustrates a flowchart of a computer-implemented method for communicating management related data provided by a management system to a user when a user subscribes to a data feed.

FIG. 8 illustrates a flowchart 800 of an embodiment of a computer-implemented method for communicating management related data provided by a management system to a user. The computer-implemented method begins at block 802 by receiving an indication that a user desires to subscribe to a selected data type. At block 804, all management related data that corresponds with the data type and criteria associated with the data type is searched in a management system. The management system can verify that the user is authenticated and authorized to access the type of information defined by the criteria. At block 806, the management related data that corresponds with the data type, the criteria and the user is collected. At block 808, the collected management related data is rendered for a display.

The method illustrated in flowchart 800 can optionally (as indicated by dashed lines) proceed to block 810 or 812. At block 810, user subscriptions can be exported using a OPML file. An OPML (Outline Processor Markup Language) file can present exported subscriptions in a hierarchial format and can be generated based on a known managed object and management related data provided by the management system. The following is an example OPML XML file:

```
<opml>
    <body>
        <outline text="RSS Feed for Management - MyServer1">
            <outline text="MOM-managed servers">
                <outline text="Server 1">
                    <outline title="Alerts"
                        htmlUrl="http://MyServer/.../html.aspx"
                        xmlUrl="http://MyServer/.../rss.aspx"/>
                    <outline title="Status reports"
                        htmlUrl="http://MyServer/.../html.aspx"
                        xmlUrl="http://MyServer/.../rss.aspx"/>
                </outline>
                <outline text="Server 2">
                    <outline title="Alerts"
```
-continued
```
                        htmlUrl="http://MyServer/.../html.aspx"
                        xmlUrl="http://MyServer/.../rss.aspx"/>
                    <outline title="Status reports"
                        htmlUrl="http://MyServer/.../html.aspx"
                        xmlUrl="http://MyServer/.../rss.aspx"/>
                </outline>
            </outline>
            <outline text="Event Logs">
                <outline text="Server 1">
                    <outline title="Application"
                        htmlUrl="http://MyServer/.../html.aspx"
                        xmlUrl="http://MyServer/.../rss.aspx" />
                    <outline title="System"
                        htmlUrl="http://MyServer/.../html.aspx"
                        xmlUrl="http://MyServer/.../rss.aspx" />
                </outline>
                <outline text="Server 2">
                    <outline title="Application"
                        htmlUrl="http://MyServer/.../html.aspx"
                        xmlUrl="http://MyServer/.../rss.aspx"/>
                    <outline title="System"
                        htmlUrl="http://MyServer/.../html.aspx"
                        xmlUrl="http://MyServer/.../rss.aspx"/>
                </outline>
            </outline>
    </body>
</opml>
```

Exporting subscriptions pertains to the embodiment illustrated in FIG. 1. Therefore, aggregator 118 stores the hierarchy of subscriptions and can exchange subscriptions with other aggregators in other user devices in a machine-readable format.

At block 812, in the embodiment illustrated in FIG. 1, the subscribed data feed items can be sent to locations remote to user device. For instance, this enables simple integration solutions between two management applications located on the network. For example, one application want to publish event to another application. The publishing application creates a data feed at a common access point between the two server type applications (for example, either a file share, or a FTP folder which is synchronized offline). The consuming server application can periodically read from the data feed without knowing or caring when the publishing application will publish a new version of the data feed. Such an embodiment does not require the applications to communicate directly through a network protocol. For example, the publishing application can be a script that periodically refreshes the data feed with the most recent events. The consuming application can periodically read the data feed file and identifies the most recent events. Based on this information, the consuming application can reconstruct the complete list of events that were recorded in the past, even if the data feed only contained the most recent events at any point in time.

Figure 9:
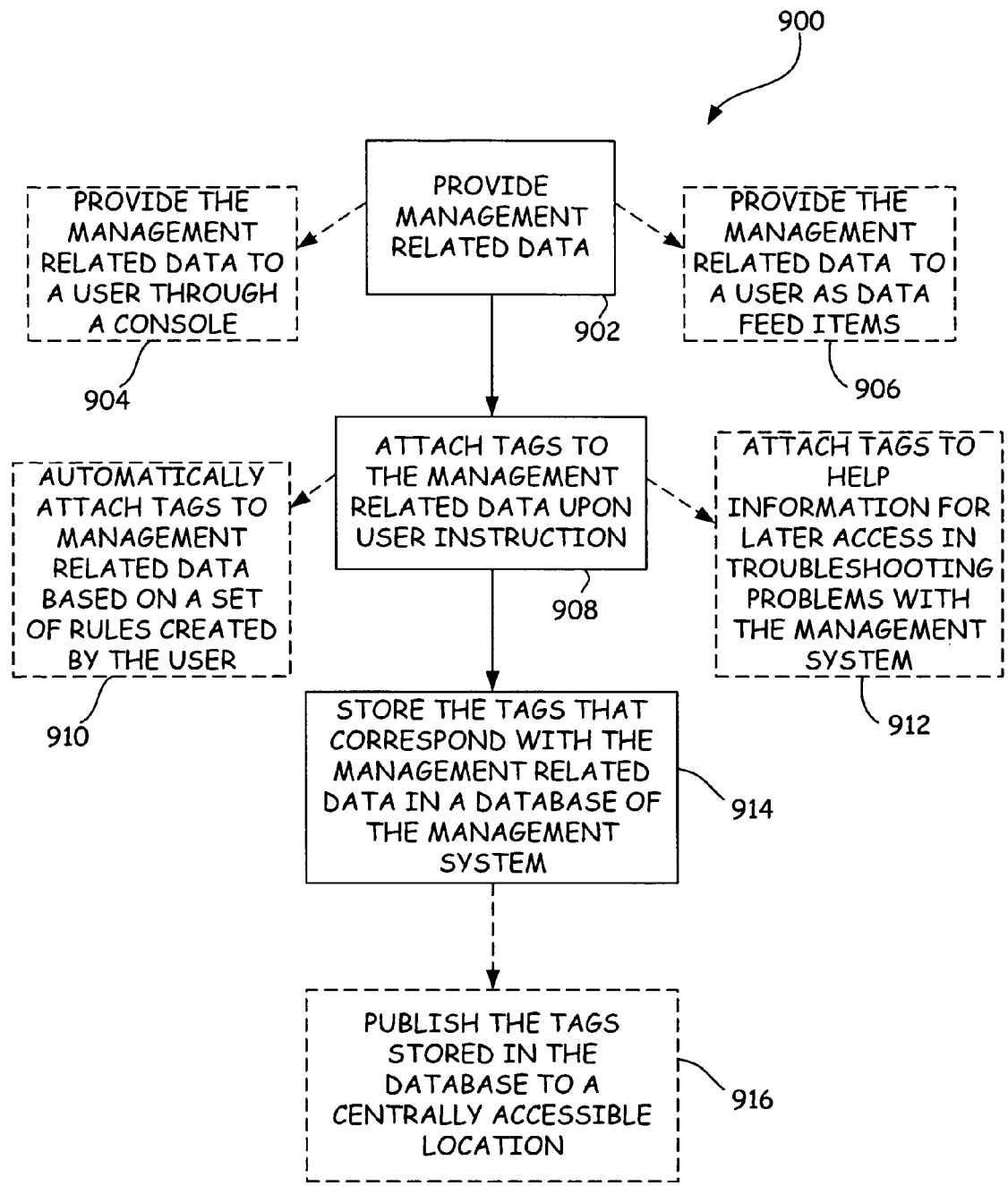
FIG. 9 illustrates a flowchart of a computer-implemented method of organizing management related data provided by a management system to a user.

FIG. 9 illustrates a flowchart 900 showing a computer-implemented method of organizing management related data. At block 902, management related data is provided. Management related data can include alerts, incidents, problems and etc. In one embodiment and at optional block 904, the management related data is provided to a user through a console. In one embodiment and at optional 906, the management related data is provided to a user as data feed items. At block 908, tags are attached to the management related data upon user instruction. The user instructions can be in the form of manual instructions. However, in one embodiment and at optional block 910, attaching tags to the management related data can be attached automatically based on a set of rules created by the user. In one embodiment and at optional block 912, attaching tags to the management related data can be attached to help information for later access in troubleshooting problems with management system 102, 602. At block 914, the tags that correspond with the management related data are stored in a database 110, 610 of the management system 102, 602. In a further embodiment and at block 916, the tags stored in the database are published to a centrally accessible location.

Figure 10:
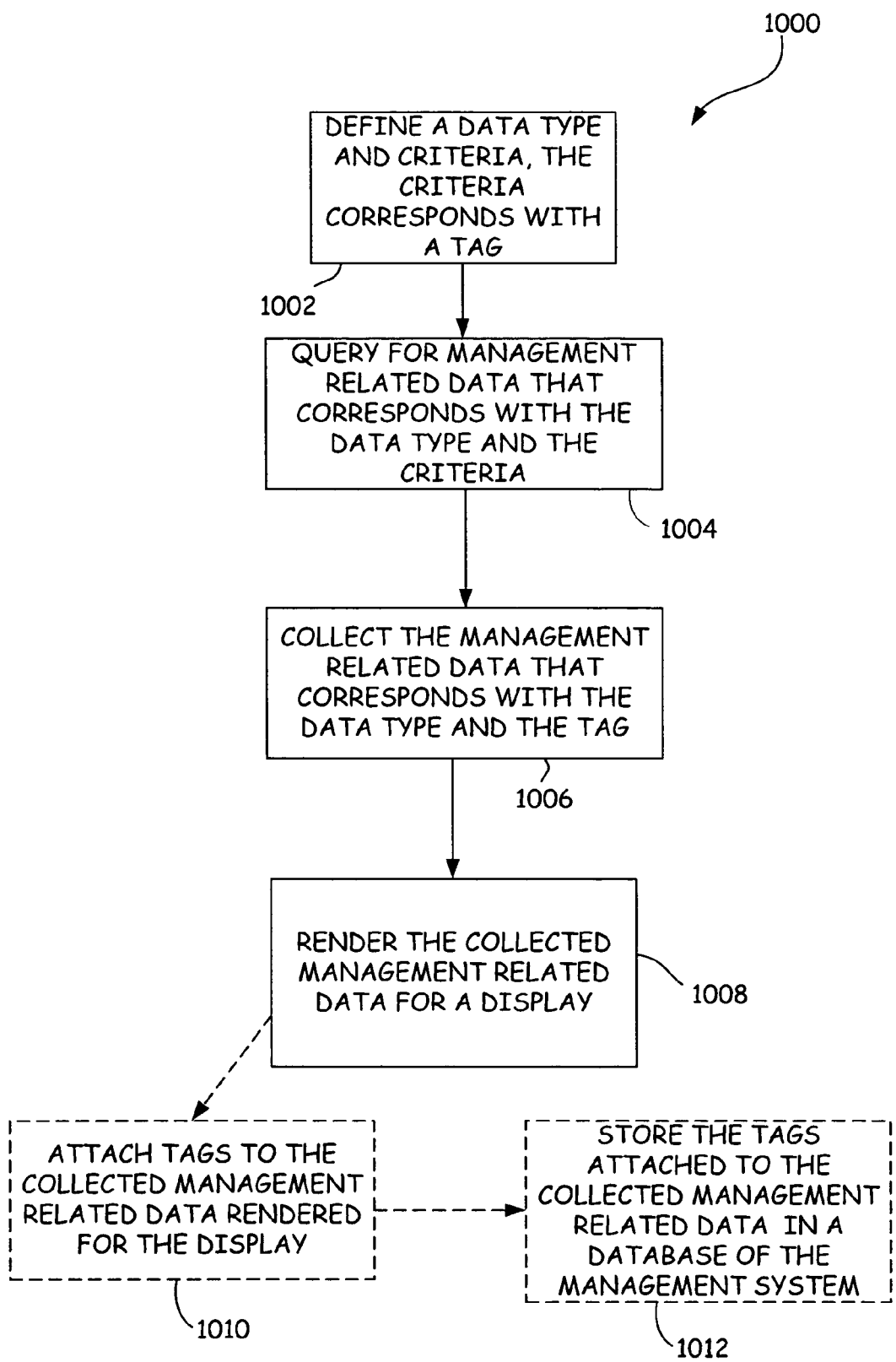
FIG. 10 illustrates a flowchart of a computer-implemented method of communicating management related data provided by a management system.

FIG. 10 illustrates a flowchart 1000 showing a computer-implemented method of communicating management related data provided by a management system to a user. The computer-implemented method begins at block 1002 by defining a data type and a criteria. Data types 114 and 614 and criteria 116 and 616 are illustrated in FIGS. 1 and 6. The criteria corresponds with a tag. At block 1004, all management related data that corresponds with the data type and the tag is queried for in management system 102, 602. At block 1006, the management related data that corresponds with the data type and the tag is collected into aggregator 118, 618. At block 1008, the collected management related data is rendered for a display 120, 620. In a further optional embodiment and at block 1010, tags are attached to the collected management related data rendered for display 120, 620. In a further option embodiment and at block 1012, the tags attached to the collected management related data are stored in database 110, 610.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of communicating management related data provided by a management system to a user, the computer-implemented method comprising:
    cataloging pieces of management related data indicative of activity of at least one of a plurality of network devices that the management system is monitoring over a network, each piece of management related data including properties and is stored in a database of the management system;
    defining data feed records specifying information that the user desires from the stored management related data, each data feed record is stored in the database of the management system and includes a data type and criteria, wherein the data type corresponds to a type of management related data that the user desires and the criteria corresponds with at least one of the properties of the type of management related data the user desires;
    querying the database of the management system for select pieces of management related data using one of the data feed records;
    sending the select pieces of management related data found in the query to a publisher, the publisher configured to generate a Really Simple Syndication (RSS) data feed item for each select piece of management related data obtained in the query and send each RSS data feed item to a user device under control of the user for rendering the RSS data feed items on a display of the user device.

2. The computer-implemented method of claim 1, wherein each data type of each data feed record is selected from a group comprising an alert, an event, a ticket, an incident, a problem, a new report, availability of a pack, a performance indicator, a health status, a notification of a problem, a notice of updated management related data, a task and a change in a performance indicator.

3. The computer-implemented method of claim 1, wherein each criteria of each data feed record is selected from a group comprising a severity level, a priority level, a networked device, a group of network devices, an assignee, a date created, a resolution state, a tag, a category, a description, an identifier and a name.

4. The computer-implemented method of claim 1, further comprising including an attachment in at least one of the RSS data feed items.

5. The computer-implemented method of claim 4, wherein including the attachment in at least one of the RSS data feed items comprises including an embedded link in the attachment.

6. The computer-implemented method of claim 1, further comprising including a link in at least one of the RSS data feed items.

7. The computer implemented method of claim 1, further comprising rendering an embedded link in at least one of the RSS data feed items, wherein the embedded link is configured to run a task or open a view on the user device to troubleshoot a problem.

8. The computer-implemented method of claim 1, further comprising receiving a tag attached to the RSS data feed item from the user and storing the tag in the database, wherein the stored tag is used as criteria when defining a data feed record.

9. The computer implemented method of claim 1, further comprising exposing the data feed records in the management system in a file share system.

10. The computer-implemented method of claim 1, wherein the criteria in each data feed record is specified in a URL by exposing a DHMTL page to the management system.

11. An information system that communicates management related data to a user, the system comprising:
    a management system configured to catalog pieces of management related data indicative of activity of at least one of a plurality of network devices that the management system is monitoring over a network, , each piece of management related data including properties;
    a database configured to store the pieces of management related data and store a plurality of data feed records indicative of information that the user desires from the stored management related data, each data feed record comprising:
        a data type that corresponds with a type of data of the data feed record that the user desires;
        a criteria that corresponds with at least one of the properties of the type of management related data the user desire;
    a publisher configured to:
        receive at least one select data feed record from the database indicative of what the user has subscribed;
        query the management system to access select pieces of management related data that correspond with the at least one select data feed record;
        generate a Really Simple Syndication (RSS) data feed item for each select piece of management related data obtained in the query;
    a user device in control of the user and including an aggregator configured to collect the RSS data feed items from the publisher, wherein the user device is configured to render the data feed items on a display of the user device for viewing by the user.

12. The system of claim 11, wherein the publisher comprises a web server that is adapted to dynamically and/or periodically create the RSS data feed item.

13. The system of claim 11, wherein the publisher comprises a file share system that is adapted to dynamically and/or periodically create the RSS data feed item.

14. The system of claim 11, wherein the management system is included in an operating system of a computing device.

15. The system of claim 11, wherein the user device is configured to attached a tag to at least one of the RSS data feed items rendered in the display and configured to send the tag to the management system, the management system configured to make the tag available to all users of the management system.

16. A computer-implemented method of communicating management related data, the computer-implemented method comprising:

cataloging pieces of management related data indicative of activity of at least one of a plurality of networked devices the management system is monitoring over a network, each piece of management related data including properties and is stored in a database of the management system;

defining data feed records specifying information that the user desires from the stored management related data, each data feed records is stored in the database of the management system and comprises:

a data type that corresponds with a type of data of the data feed record that the user desires the data type selected from a group comprising an alert, an event, a ticket, an incident, a problem, a new report, availability of a pack, a performance indicator, a health status, a notification of a problem, a notice of updated management related data, a task and a change in a performance indicator;

a criteria that corresponds with at least one of the properties of the type of management related data the user desire, the criteria selected from a group comprising a severity level, a priority level, a managed networked device, a group of managed network devices, an assignee, a date created, a resolution state, a tag, a category, a description, an identifier and a name;

querying the database of the management system for select pieces of using one of the data feed records;

sending the select pieces of management related data found in the query to a publisher, the publisher configured to generate a Really Simple Syndication (RSS) a data feed item for each select piece of management related data obtained in the query and sending each RSS data feed item to a user device in control of the user for rendering the RSS data feed items on a display of the user device.

17. The computer-implemented method of claim 16, further comprising exporting management related data that the user desires in an OPML file.

18. The computer-implemented method of claim 16, further comprising sending the RSS data feed items to a location remote from the display.

* * * * *